United States Patent [19]

Berte et al.

[11] 4,290,012
[45] Sep. 15, 1981

[54] DEVICE FOR QUANTITATIVE DISPLAY OF THE CURRENT DENSITY WITHIN A CHARGED-PARTICLE BEAM

[75] Inventors: Marc Berte; Pierre Legrand, both of Paris, France

[73] Assignee: Thomson-CSF, Paris, France

[21] Appl. No.: 90,920

[22] Filed: Nov. 5, 1979

[30] Foreign Application Priority Data

Nov. 7, 1978 [FR] France .............................. 78 31437

[51] Int. Cl.³ .......................................... G01N 27/00
[52] U.S. Cl. ............................ 324/71 EB; 250/492 B
[58] Field of Search ................ 324/71 R, 71 EB, 404; 250/492 B

[56] References Cited

U.S. PATENT DOCUMENTS 3,524,998  8/1970  Gilbert ........................ 324/71 EB
3,638,111  1/1972  Ennis .......................... 324/71 EB

OTHER PUBLICATIONS

A. Fortino et al., Ion Implantation Beam Monitor, IBM tech Bulletin, Vol. 21, No. 6, Nov. 1978, p. 2254.

Primary Examiner—Michael J. Tokar
Attorney, Agent, or Firm—Cushman, Darby & Cushman

[57] ABSTRACT

The device for displaying the distribution of current density of a beam of electrically charged particles comprises a support plate of electrically insulating material having a surface area at least equal to the cross-sectional area of the beam and $m \times n = q$ electrically conducting elements e which are fixed on the support plate in a lattice array of m lines and n columns. These elements $e_{mn}$ intercept portions of the beam and are each electrically connected to a system designed to process the electrical signals collected by said elements and to display the current density at $m \times n$ points of the beam cross-section.

4 Claims, 7 Drawing Figures

DEVICE FOR QUANTITATIVE DISPLAY OF THE CURRENT DENSITY WITHIN A CHARGED-PARTICLE BEAM

This invention relates to a device for displaying the distribution of current density within a chargedparticle beam and more especially an ion beam employed in an ion-beam machining apparatus.

One known means for measuring current density within a beam of charged particles is to place a reference surface on the beam path and then to measure the erosion produced by the beam on the surface subjected to bombardment.

Another known practice is to measure the distribution of current density within a beam by employing a device of known type, comprising a series of concentric annular and coplanar collecting electrodes, a rotary shutter being placed above said electrodes and pierced radially by orifices which are equal in number to the annular electrodes, each orifice being placed opposite to said electrodes. Measurement of the currents received by the collecting electrodes during one revolution of the shutter makes it possible to determine the distribution of density within the beam in respect of different radii and as a function of the angle of rotation of said shutter.

By means of the device according to the present invention, the current density of a beam of charged particles can be displayed simultaneously at different points of its cross-section and a homogeneous beam can be obtained by modifying the different operating parameters of the particle source.

According to the invention, a device for displaying the distribution of current density within a beam of electrically charged particles essentially comprises a support plate of electrically insulating material having a surface area at least equal to the cross-sectional area of the beam, $m \times n = q$ electrically conducting elements fixed on the support plate and so arranged as to form a lattice of elements consisting of m lines and n columns, said elements being intended to intercept the charged particles of the beam. Each element is electrically connected to a system for processing electrical signals collected by said elements. Said processing system makes it possible to define the density of the beam at $m \times n$ points of its cross-section.

A more complete understanding of the invention will be gained from the following description in which further distinctive features will become apparent, reference being made to the accompanying drawings in which.

Figure 1:
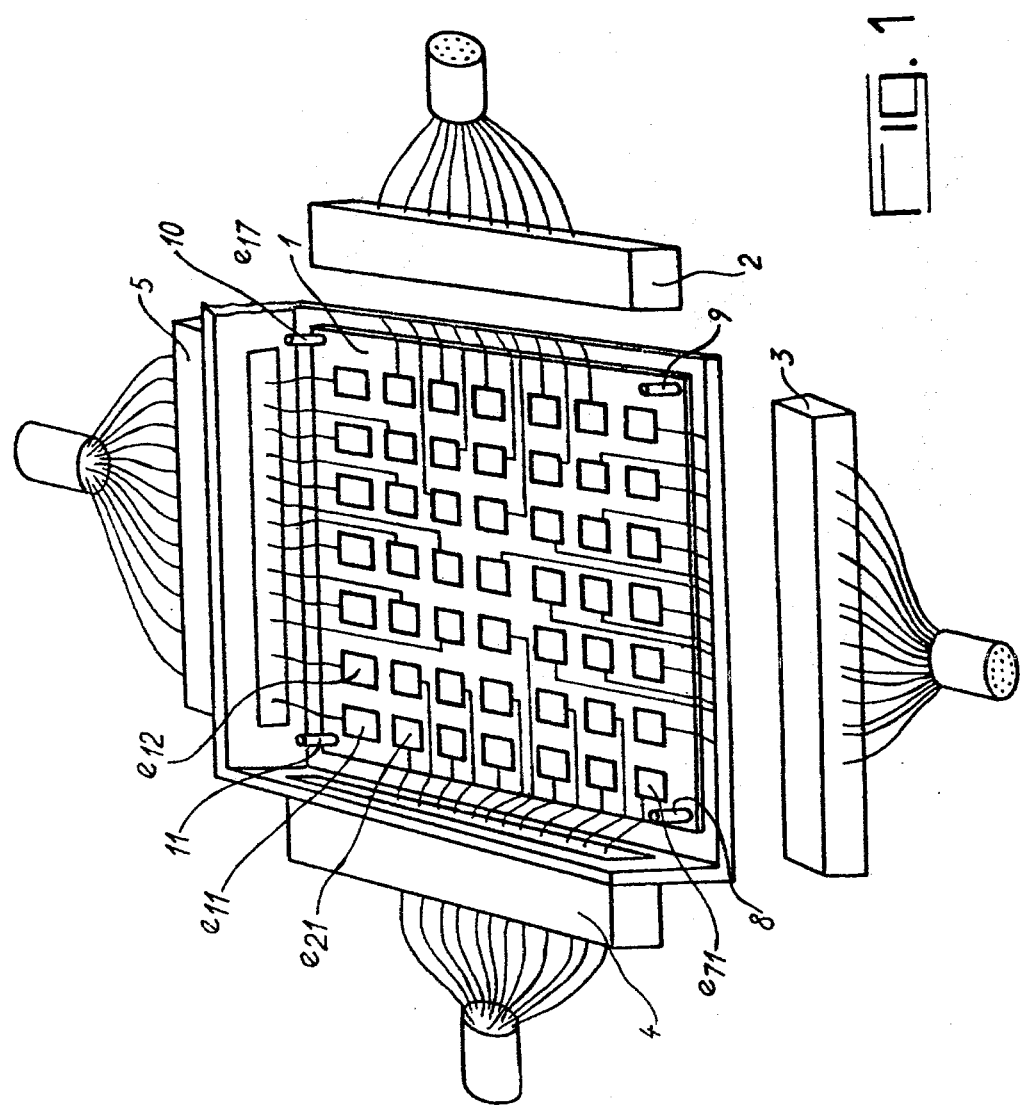
FIG. 1 illustrates one example of construction of the measuring device according to the invention.

The display device according to the invention as shown in FIG. 1 comprises a support plate 1 of electrically insulating material (such as alumina, for example) on which are fixed $m \times n$ collecting elements $e_{11}$, $e_{12}$, $e_{13}$ ... $e_{21}$, $e_{22}$, $e_{23}$ ... $e_m$ formed of electrically conducting material, said elements being so arranged as to form a lattice consisting of m lines and n columns. Each element $e_{mn}$ is connected by means of an electric conductor to one of the connectors 2, 3, 4, 5.

Figure 3:
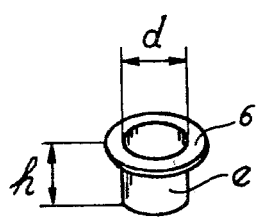
FIGS. 3 and 4 show details of construction of the device of FIG. 2.

In the example of FIG. 1, the collecting elements $e_{mn}$ are small metal plates of square shape. These elements $e_{mn}$ can have other shapes, however, and in particular a shape of the type shown in FIG. 3 in which the collecting element e is a cup of cylindrical shape. Said cup is formed of electrically conducting material and provided with a flange 6 of substantial width.

The collecting element e can be either positively or negatively biased according to the nature of the particles employed (in the case of ions, the element e will be negatively biased).

The depth h of the cup is greater than its diameter d in order to reduce secondary emission of the element e to a minimum.

Figure 2:
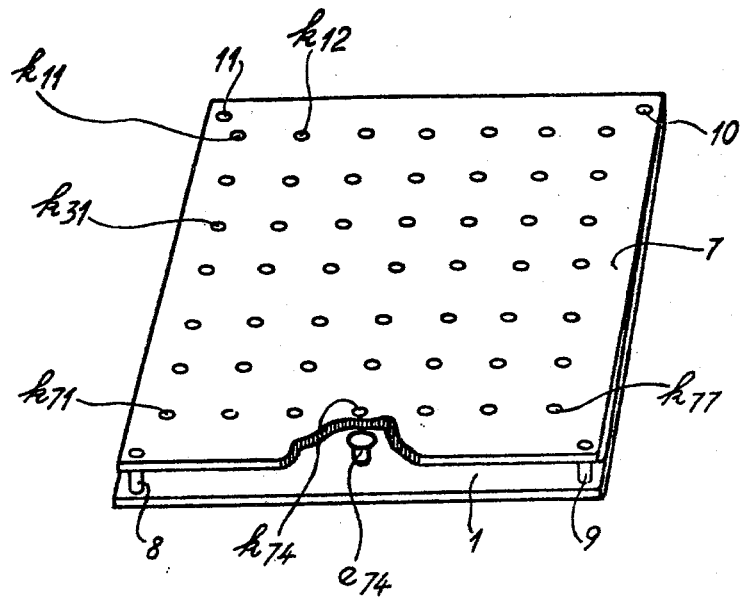
FIG. 2 shows another example of construction of the measuring device according to the invention.

In a preferred example of construction of the display device according to the invention as shown in FIG. 2, a screen plate 7 is placed above the support plate 1 and maintained in a suitable position by means of electrically insulating spacers 8, 9, 10, 11. There are formed in said screen plate 7 q holes $k_{11}$, $k_{12}$, ... $k_{21}$, $k_{22}$, ... $k_{mn}$, each hole $k_{mn}$ being superposed on, and in register with, the corresponding element $e_{mn}$ (as shown in FIG. 1). The plate 7 of electrically conducting material is connected to ground.

Figure 4:
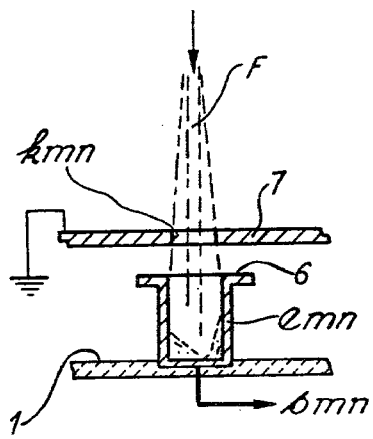

The device is intended to be placed on the path of the charged particle beam at right angles to the mean path of said beam F, the screen plate 7 being placed upstream of the support plate 1. Since the diameter of the holes $k_{mn}$ is substantially equal to the internal diameter of the cylindrical elements $e_{mn}$ (as shown in FIG. 4), that portion of the beam F which passes through each hole $k_{mn}$ is collected by the corresponding collecting element $e_{mn}$ and this latter will deliver a signal $s_{mn}$ which is proportional to the current received.

Figure 5:
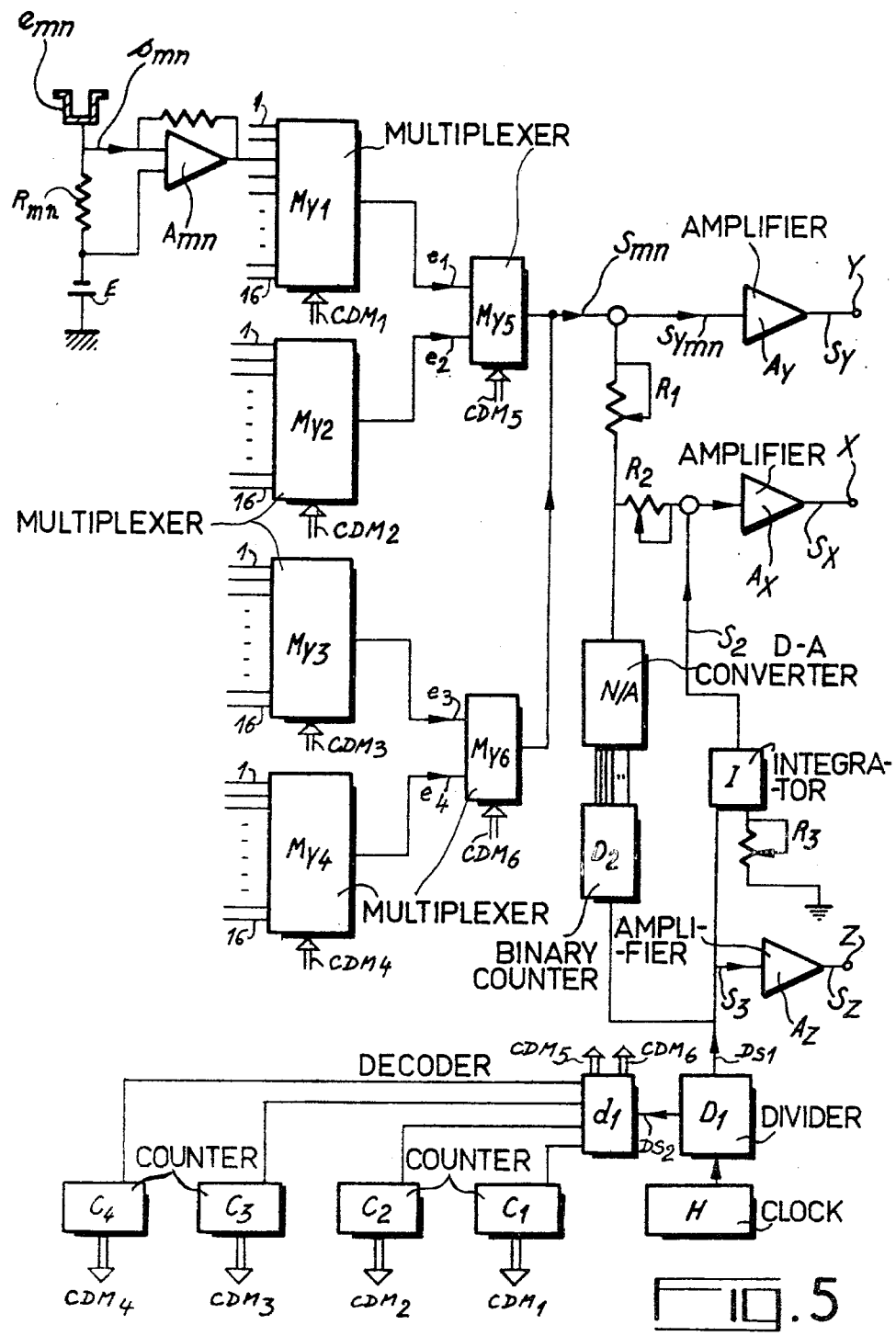
FIG. 5 is a schematic diagram of a system for processing signals collected by the device according to the invention.

A system according to the invention for processing the collected signals $s_{mn}$ is shown diagrammatically in FIG. 5. In this example of construction, said processing system comprises in combination:

q differential amplifiers $A_{mn}$ having two input connections and being associated respectively with the q elements $e_{mn}$ delivering the signals $s_{mn}$; one of the input connections being connected to one of the elements $e_{mn}$ and the other input connection being connected to a direct current voltage sourcs E delivering an adjustable voltage designed to be applied to said differential amplifiers $A_{mn}$;

a two-level multiplexing system constituted by multiplexers $M_{Y1}$, $M_{Y2}$, $M_{Y3}$, $M_{Y4}$ and $M_{Y5}$, $M_{Y6}$ which deliver signals $S_{Ymn}$;

an amplifier $A_Y$ for delivering signals $S_Y$ which are proportional to the signals $S_{Ymn}$ and intended to be injected into the channel Y of an oscilloscope;

a time-base system which is controlled by a clock H associated with counters $C_1$, $C_2$, $C_3$, $C_4$ and generates drive pulses for controlling the multiplexing system;

a divider $D_1$, a binary counter $D_2$ a decoder $d_1$;

a digital-analog converter N;

an integrator I for delivering a scanning signal $S_2$ by means of pulses delivered by the clock H;

an amplifier $A_X$ for delivering a signal $S_X$ to be injected into channel X of the oscilloscope;

a blanking amplifier $A_Z$ for modulating the amplitude of the signal $S_3$ delivered by the clock H and for delivering the signal $S_Z$ which ensures scanning retrace blanking when injected into channel Z of the oscilloscope.

One example of construction of a system according to the invention for processing and displaying signals $s_{mn}$ is illustrated in FIG. 5. The signals $s_{mn}$ are those which are collected at the output of q collecting elements $e_{mn}$. Said elements are disposed at intervals on a screen plate such as the plate 7 shown in FIG. 2, the number q being equal to m × n.

Each collecting element $e_{mn}$ is capable of delivering an output signal $s_{mn}$ consisting of an electric current which is proportional to the flux of incident particles. The case which is contemplated by way of example in the embodiment of FIG. 5 is that of an ion beam in which the ion source can be a duoplasmatron, for example. If a predetermined collecting element $e_{mn}$ is considered, this element forms with the ion source an electric circuit which is equivalent to the loop circuit comprising in series a direct-current high-voltage source (of the order of 2000 V) having a high internal resistance (of the order of $4 \times 10^6 \Omega$) and the measuring resistor $R_{mn}$ of FIG. 5 in series with a direct-current voltage source E. The current which flows through the resistor $R_{mn}$ is therefore proportional to the ion current and will cause a potential difference to appear at the terminals of the resistor $R_{mn}$. Said potential difference is also proportional to the ion current collected by the element $e_{mn}$, that is, proportional to the parameter to be measured and displayed.

A differential amplifier $A_{mn}$ will be associated with each collecting element $e_{mn}$. This amplifier collects between its two input terminals the potential difference developed at the terminals of the resistor $R_{mn}$ and amplifies said difference. The differential amplifier $A_{mn}$ also provides the interface between the collecting elements and the electronic elements for processing measured signals, especially matching of impedances and of levels of said signals.

The supply E is a single reference supply which is common to all the differential amplifiers $A_{mn}$ and must be of the "floating" type. In conjunction with the amplifiers $A_{mn}$, this supply takes part in the aforementioned electrical matching between the two subassemblies of the system and permits greater amplitude excursion of the signals to be measured. This supply must be in opposition to the equivalent electromotive force (e.m.f.) at the ion source; its positive pole is connected to the frame ground of the system for processing and displaying the signals $s_{mn}$; and the amplitude of the back-e.m.f. force to be developed by the supply is of the order of 50 V. All the resistors $R_{mn}$ are identical and can be of the order of 2 kilohms. One example of a suitable differential amplifier is the Type LM 324 integrated circuit amplifier produced commercially by the National Semiconductor Corporation.

The output signals of these differential amplifiers are then transmitted to the inputs of circuits of a first multiplexing level. In FIG. 5, four multiplexers $M_{Y1}$ to $M_{Y4}$ for analog signals are shown. In order to gain a clear idea, it will be assumed below that the number of collecting elements $e_{mn}$ is sixty-four disposed at intervals on a square matrix (in other words: q=64 and m=n=8). Each multiplexer $M_{Y1}$ to $M_{Y4}$ is therefore provided with eight signal inputs. In addition to these inputs, provision is made for multiplexing control inputs $CDM_1$ to $CDM_4$. In the example of FIG. 5, each multiplexer $M_{Y1}$ to $M_{Y4}$ can be constituted by an integrated module of Type DG 506 produced by the Siliconix Company and having four multiplexing control inputs for receiving one four-bit binary word. An internal decoder converts these four bits to sixteen possibilities for switching the sixteen input signals to the single output. The connection order takes place as follows: input 1 of multiplexer $M_{Y1}$ connected to output $s_{11}$; input 2 of multiplexer $M_{Y1}$ connected to output $s_{15}$ and so forth. The other signals and supply voltages which are necessary for good operation of these multiplexing circuits (and especially the permission signal for effective processing of the multiplexing control signals) have not been shown in the drawings. These signals are well known to anyone versed in the art.

The outputs of the multiplexers $M_{Y1}$ to $M_{Y2}$ are transmitted in pairs to a second multiplexing level constituted by two double analog gates $M_{Y5}$ and $M_{Y6}$, the single outputs of which are connected to each other so as to form a "wired-OR" logic function constituting the general output $S_{mn}$ of the multiplexing circuits. Each analog gate $M_{Y5}$, $M_{Y6}$ which can be an integrated module of type DG 181 commercialized by the manufacturer mentioned earlier, for example, comprises multiplexing control inputs $CDM_5$ and $CDM_6$ respectively which are two in number and each intended to receive at predetermined instants the binary control words "10" "01" or "00" (this latter corresponds to a non-activated phase). The first control are present on the input of the multiplexer $M_{Y5}$ toward the amplifier $A_Y$; the second control word "01" initiates switching of the signals $e_2$ and $e_4$ present on the input of the multiplexer $M_{Y6}$ toward the amplifier, and so on.

The multiplexed signals which are present on $S_{mn}$ constitute the sampled signals to be displayed. The screen of an oscilloscope can be employed for this purpose. In this case the signals $S_{mn}$ are transmitted to the channel Y of a cathode-ray tube (not shown) via the amplifier $A_Y$ of said channel Y.

Figure 7:
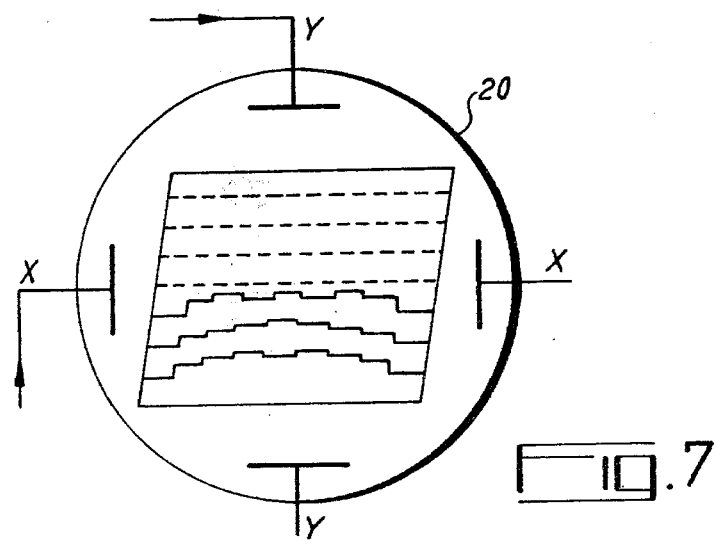

In accordance with one advantageous feature of the invention and in order to improve the visual display of the sampled signals, this display will be given in pseudo-perspective as illustrated in FIG. 7. The rectangular matrix of collectors (which are sixty-four in number in the case of the example (chosen) is converted to a parallelogram. The plane of the parallelogram is in turn divided into zones: each zone or elementary parallelogram represents one of the collecting elements $e_{mn}$ which are distributed in m lines and n columns. In the concrete example of FIG. 5, it is therefore necessary to obtain eight horizontal scanning lines X each divided into eight zones of equal value. In the case of each of these zones, the amplitude of vertical scanning Y with respect to the rest position of the scanning line represents the amplitude of the sampled signal $S_{mn}$ corresponding to said zone.

Figure 6:
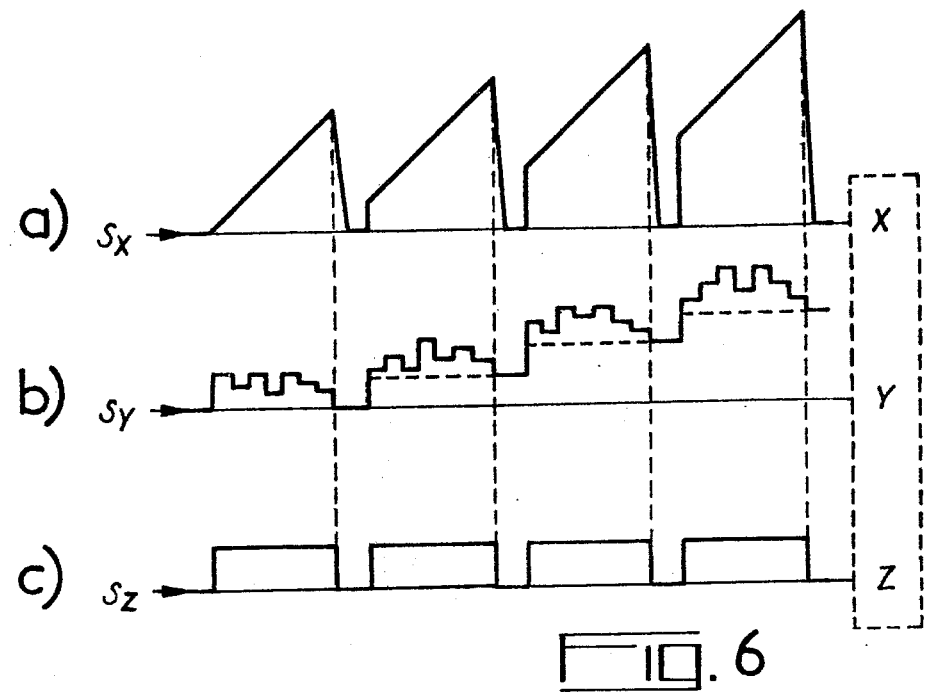
FIGS. 6 and 7 show respectively the signals applied to the inputs X, Y, Z of a cathode-ray tube, and the visual display of the current density within the charged particle beam.

In order to carry out the method which has just been described, it is necessary on the one hand to superimpose a stair-step signal of equal height on the signals $S_{mn}$ in channel Y in order to obtain the composite signal illustrated on line $S_Y$ (representing the output $S_Y$ of the amplifier $A_Y$) of FIG. 6 and, on the other hand, to superimpose another stair-step signal of equal height on a conventional sawtooth scanning signal X in order to obtain the composite signal illustrated on line $S_X$ (output $S_X$ of the amplifier $A_X$). In accordance with well-known practice, it is also necessary to produce a blanking signal during the line retrace. This signal $S_Z$ which is transmitted by the amplifier $A_Z$ to channel Z of the oscilloscope is illustrated on line $S_Z$ of FIG. 6.

These different signals as well as the multiplexing control signals are produced by a group of logic circuits which will now be described.

An isochronous pulse generator or a circuit of similar type produces a pulse signal having a high and stable frequency which is transmitted to the input of a divider $D_1$. This divider can be constituted by a binary scaler or any other type of counter for reducing the frequency of the generator H to a suitable value in accordance with the technologies employed for the construction of multiplexing and display circuits.

The signals at the output $D_{S1}$ are transmitted on the one hand to the counting input of a binary counter $D_2$ and on the other hand to an integrator I. These signals are also transmitted to the input $S_3$ of the amplifier $A_Z$ of the channel Z. The frequency of said signals is therefore equal to the line scanning frequency. The integrator serves to produce the sawtooth scanning signals X and can comprise in particular an operational amplifier provided with two differential inputs and with capacitive feedback circuits. The amplitude of the sawtooth signals can be adjusted by means of the potentiometer $R_3$ which is connected to one of the inputs of the operational amplifier. This method of obtaining sawtooth signals is well known to those versed in the art and will therefore not be described further. The output $S_2$ of the integrator is transmitted to the input of the amplifier $A_X$ of the channel X which is employed for horizontal scanning.

The binary counter $D_2$ has a capacity or in other words a number of stages which is limited to the number of lines, namely eight lines in the example described. The outputs of its eight stages are transmitted to the inputs of a digital-to-analog converter N/A, the output of which delivers a stair-step signal representing the successive binary weights of one to eight. After this cycle, the counter is reset to zero. The digital-to-analog converter is constituted for example by a simple network of scale-weighted resistors. Any other type of circuits or combination of circuits for switching from a pulse signal having a predetermined frequency to a stair-step signal can be employed within the scope of the invention. The digital converter in accordance with this design therefore makes it possible to obtain a stair-step signal which will be superimposed via the adjustment potentiometers $R_1$ and $R_2$, respectively on the multiplexed signals $S_{mn}$ in order to constitute the composite signal $S_{Ymn}$ (and the signal $X_Y$ after amplification) and on the sawtooth signals $S_2$ (in order to constitute the signal $S_X$ after amplification). The desired display in the form of a parallelogram on the screen of the oscilloscope is thus obtained by means of this method.

The divider $D_1$ also delivers on a second output $D_{S2}$ a signal having the same frequency as the signal of output $D_{S1}$ but having a phase with respect to that of said signal $D_{S1}$ which can be adapted for technological reasons relating to the choice of logic circuits and of multiplexers. This signal is transmitted to a decoder $d_1$. The intended function of this latter is on the one hand to ensure uniform distribution of the input signals (that is, at a rate of one in four in the example described) in order to transmit said signals to the counting inputs of four binary counters $C_1$ to $C_4$ each having a four-bit capacity; the outputs of these four counters constitute the multiplexing control signals $CDM_1$ to $CDM_4$. Distribution can be performed simply by means of a shift register which receives the signals $D_{S2}$ and the outputs of which are connected to AND-type logic gates or by means of any other known method. The decoder $d_1$ also produces the sequential control signals $CDM_5$ and $CDM_6$ in the chronological order given by the table below:

| $CDM_5$ | $CDM_6$ | switching operation performed |
|---------|---------|-------------------------------|
| 1 0     | 0 0     | $e_1 \rightarrow S_{mn}$      |
| 0 1     | 0 0     | $e_2 \rightarrow S_{mn}$      |
| 0 0     | 1 0     | $e_3 \rightarrow S_{mn}$      |
| 0 0     | 0 1     | $e_4 \rightarrow S_{mn}$      |

The cycle is then repeated in exactly the same manner.

The invention is not limited to the example of construction described in the foregoing. In particular, specific types of logic circuits have been mentioned solely in order to provide an explanatory illustration of a concrete embodiment of the invention but there are many other commercially available types. Finally, visual display can be performed by means of a unit other than a cathode-ray tube. Without any limitation being implied, it is possible by way of example to employ a matrix panel of plasma cells or of liquid crystal cells. The frequency and the control signals must be adapted to the specific character of the display devices selected for use.

What we claim is:

1. A device for displaying the distribution of current density within a beam of electrically charged particles, said device comprising a support plate of electrically insulating material having a surface area at least equal to the cross-sectional area of the beam, $m \times n = q$ electrically conducting elements fixed on the support plate being so arranged as to form a lattice of elements which consist of m lines and n columns and are intended to intercept the charged particles of the beam to a partial extent, said elements being electrically connected to systems which serve to process electrical signals collected by said elements and to display the density of the beam at $m \times n$ points of its cross-section, said device having a screen plate provided with $m \times n$ holes, said screen plate being placed above said support plate, each of said $m \times n$ holes being placed directly above one of said elements, said screen plate being of electrically insulating material.

2. A device for displaying the distribution of current density within a beam of electrically charged particles, said device comprising a support plate of electrically insulating material having a surface area at least equal to the cross-sectional area of the beam, $m \times n = q$ electrically conducting elements fixed on the support plate being so arranged as to form a lattice of elements which consist of m lines and n columns and are intended to intercept the charged particles of the beam to a partial extent, said elements being electrically connected to systems which serve to process electrical signals collected by said elements and to display the density of the beam at $m \times n$ points of its cross-section, said device having a screen plate provided with $m \times n$ holes, said screen plate being placed above said support plate, each of said m×n holes being placed directly above one of said elements, said screen plate which is of electrically conducting material is positively biaised, said charged particle beam being an ion beam.

3. A display device according to claims 1 or 2, wherein said system for processing said signal collected by each collecting element comprises:

q differential amplifiers having two input connections and being associated respectively with said q elements delivering said signals $s_m$; one of said input connections being connected to one of said elements and the other input connecting being connected to a direct current voltage source delivering an adjustable voltage designed to be applied to said differential amplifiers.

4. A display device as claimed in claim 3, further comprising:

a two-level multiplexing system constituted by multiplexers which deliver signals $S_{mn}$;

an amplifier for delivering a signal $S_Y$ which is proportional to a composite signal $S_{Ymn}$ and intended to be injected into a channel Y of an oscilloscope;

a time-base system which is controlled by a clock associated to four counters and generates drive pulses for controlling said multiplexing system;

a divider associated to said clock and delivering two signals $D_{S1}$ and $D_{S2}$;

a binary counter;

a decoder designed to receive said signal $D_{S2}$;

a digital analog converter;

an integrator for delivering a scanning signal $S_2$ by means of pulses delivered by said clock;

an amplifier for delivering from a signal $S_2$ a signal $S_X$ which is intended to be projected into channel X of said oscilloscope;

a blanking amplifier for modulating the amplitude of a signal $S_3$ delivered by said clock in order to produce a signal $S_Z$ which ensures scanning retrace blanking when injected into a channel Z of said oscilloscope.

* * * * *